US009854559B2

(12) United States Patent
Gao et al.

(10) Patent No.: US 9,854,559 B2
(45) Date of Patent: Dec. 26, 2017

(54) METHOD AND DEVICE FOR PUSHING USER INFORMATION

(71) Applicant: Xiaomi Inc., Beijing (CN)

(72) Inventors: Yi Gao, Beijing (CN); Hongqiang Wang, Beijing (CN); Yunyuan Ge, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/143,959

(22) Filed: May 2, 2016

(65) Prior Publication Data
US 2017/0156126 A1    Jun. 1, 2017

(30) Foreign Application Priority Data
Nov. 30, 2015    (CN) .......................... 2015 1 0857214

(51) Int. Cl.
| H04B 7/00 | (2006.01) |
| H04W 68/00 | (2009.01) |
| H04W 4/00 | (2009.01) |
| H04L 29/08 | (2006.01) |
| G06F 17/30 | (2006.01) |
| H04L 29/12 | (2006.01) |

(52) U.S. Cl.
CPC ...... *H04W 68/00* (2013.01); *G06F 17/30997* (2013.01); *H04L 61/1594* (2013.01); *H04L 67/26* (2013.01); *H04W 4/005* (2013.01); *H04W 4/008* (2013.01); *H04L 61/6081* (2013.01)

(58) Field of Classification Search
CPC ... H04L 67/26; H04L 63/0876; H04W 4/0086

USPC ........................................................ 455/41.2
See application file for complete search history.

(56) References Cited

U.S. PATENT DOCUMENTS

| 8,874,039 | B2 | 10/2014 | Bellé et al. | |
| 2007/0293193 | A1 | 12/2007 | Ramsten et al. | |
| 2013/0023213 | A1 | 1/2013 | Bellé et al. | |
| 2016/0037299 | A1* | 2/2016 | Fisher | H04W 64/003 |
| | | | | 455/456.3 |
| 2016/0105768 | A1* | 4/2016 | Pinard | H04W 4/023 |
| | | | | 455/457 |

FOREIGN PATENT DOCUMENTS

| CN | 103634735 A | 3/2014 |
| CN | 104244172 A | 12/2014 |

(Continued)

OTHER PUBLICATIONS

International Search Report dated Sep. 13, 2016 in PCT/CN2015/099794.

(Continued)

*Primary Examiner* — Eugene Yun
(74) *Attorney, Agent, or Firm* — Oblon, McClelland, Maier & Neustadt, L.L.P.

(57) ABSTRACT

The disclosure relates to a method, device, and non-transitory computer-readable medium for pushing user information. The method includes obtaining a first identity (ID) of a first user equipment (UE) through short distance communication; searching a first database to obtain first user information corresponding to the first ID, the first database including user information corresponding to respective ones of a plurality of UE IDs; and outputting a push notification including the first user information.

12 Claims, 12 Drawing Sheets

(56) References Cited

FOREIGN PATENT DOCUMENTS

| | | |
|---|---|---|
| CN | 104796546 A | 7/2015 |
| KR | 10-2004-0087216 A | 10/2004 |
| KR | 10-2009-0024262 A | 3/2009 |
| KR | 1020090053282 A | 5/2009 |
| KR | 1020090066102 A | 6/2009 |

OTHER PUBLICATIONS

Written Opinion dated Sep. 13, 2016 in PCT/CN2015/099794.
Extended European Search Report dated Aug. 17, 2016 in Patent Application No. 16169174.6.
Office Action dated Oct. 28, 2017, in Korean Patent Application No. 10-2016-7025358.

\* cited by examiner

METHOD AND DEVICE FOR PUSHING USER INFORMATION

CROSS-REFERENCE TO RELATED APPLICATIONS

This application is based upon and claims priority to Chinese Patent Application No. 201510857214.5 filed on Nov. 30, 2015, the entire contents of which are incorporated herein by reference.

TECHNICAL FIELD

The present disclosure relates to the field of wireless communication, and more particularly, to a method and device for pushing user information.

BACKGROUND

With the manner of interpersonal communication becoming more and more convenient, a user increasingly needs to remember user information of a large number of users, such as name and contact information.

In a practical application, since a user usually cannot remember accurately the user information of each user, related problems arise. For example, a few days after the user and a colleague introduced each other by names and chatted a lot at their first meeting, when the user meets the colleague again, the user may not be able to recall the name of the colleague, which causes embarrassment and inconvenience.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method for pushing user information. The method includes obtaining a first identity (ID) of a first user equipment (UE) through short distance communication; searching a first database to obtain first user information corresponding to the first ID, the first database including user information corresponding to respective ones of a plurality of UE IDs; and outputting a push notification including the first user information.

When it is detected that the user information corresponding to the first ID does not exist in the first database, the method includes generating an edit request including the first ID; receiving an edit response including a received user information; and storing the received user information, which is designated as the user information corresponding to the first ID.

When the first ID is not an ID of a detected UE, the method includes searching the first database to obtain the first user information corresponding to the first ID.

The method also includes generating a first option that is configured to allow a user to toggle push notifications for respective ones of the plurality of UE IDs, wherein the first option includes the first user information.

The method also includes receiving a selection to activate the first option for the first ID; and adding a first marker to the first ID in the first database. The first marker is configured to prevent an output of the push notification including the first user information.

Aspects of the disclosure also provide a device for pushing user information. The device includes a processor and a storage, which is configured to store an instruction executable by the processor. The processor is configured to obtain a first identity (ID) of a first user equipment (LIE) through short distance communication; search a first database to obtain first user information corresponding to the first ID, the first database including user information corresponding to respective ones of a plurality of UE IDs; and output a push notification including the first user information.

The processor is further configured to, when it is detected that the user information corresponding to the first ID does not exist in the first database, generate an edit request including the first ID; receive an edit response including a received user information; and store the received user information, which is designated as the user information corresponding to the first ID.

The processor is further configured to, when the first ID is not an ID of a detected UE, search the first database to obtain the first user information corresponding to the first ID.

The processor is further configured to generate a first option that is configured to allow a user to toggle push notifications for respective ones of the plurality of UE IDs, wherein the first option includes the first user information.

The processor is further configured to receive a selection to activate the first option for the first ID; and add a first marker to the first ID in the first database. The first marker is configured to prevent an output of the push notification including the first user information.

Aspects of the disclosure also provide a non-transitory computer-readable storage medium having stored therein instructions that, when executed by a processor, cause the processor to obtain a first identity (ID) of a first user equipment (UE) through short distance communication; search a first database to obtain first user information corresponding to the first ID, the first database including user information corresponding to respective ones of a plurality of UE IDs; and output a push notification including the first user information.

The non-transitory computer-readable storage medium further includes stored instructions that, when executed by the processor, cause the processor to generate an edit request including the first ID when it is detected that the user information corresponding to the first ID does not exist in the first database; receive an edit response including a received user information; and store the received user information, which is designated as the user information corresponding to the first ID.

The non-transitory computer-readable storage medium further includes stored instructions that, when executed by the processor, cause the processor to, when the first ID is not an ID of a detected LIE, search the first database to obtain the first user information corresponding to the first ID.

The non-transitory computer-readable storage medium further includes stored instructions that, when executed by the processor, cause the processor to generate a first option that is configured to allow a user to toggle push notifications for respective ones of the plurality of UE IDs, wherein the first option includes the first user information.

The non-transitory computer-readable storage medium further includes stored instructions that, when executed by the processor, cause the processor to receive a selection to activate the first option for the first ID; and add a first marker to the first ID in the first database. The first marker is configured to prevent an output of the push notification including the first user information.

It is to be understood that the above general description and the following detailed description are only exemplary and explanatory, and are not restrictive of the present disclosure.

BRIEF DESCRIPTION OF THE DRAWINGS

The accompanying drawings, which are incorporated in this specification and constitute a part of this specification, illustrate aspects consistent with the present disclosure and, together with the description, serve to explain the principles of the present disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of exemplary aspects do not represent all implementations consistent with the disclosure. Instead, they are merely examples of devices and methods consistent with aspects related to the disclosure as recited in the appended claims.

Figure 1A:
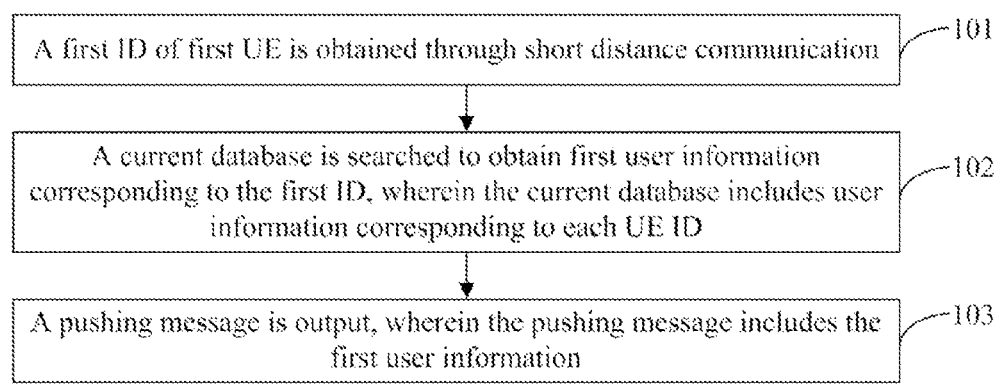
FIG. 1A is a flowchart showing a method for pushing user information, according to an exemplary aspect of the present disclosure.

FIG. 1A is a flowchart showing a method for pushing user information, according to an exemplary aspect; as shown in FIG. 1A, the present aspect is illustrated by applying the method for pushing user information to a device for pushing user information; the method for pushing user information may include the following steps.

In Step 101, a first ID of first UE is obtained through near field communication.

Specifically, the executive body of the present aspect may be a device for pushing user information, which is equipped with functions of near field communication and pushing processing, such as a terminal and a wearable device. The step is illustrated through a practical application scene:

a user carries a device for pushing user information; when there are other users getting close to the user, the device for pushing user information obtains the first ID of the first UE carried by said other users through the near field communication in order to implement the following solutions.

Here, there may be various manners of short distance communication, such as Near Field Communication (NFC) and Bluetooth, which are not limited by the present aspect herein.

In Step 102, the current database is searched to obtain first user information corresponding to the first ID, wherein the database includes the user information corresponding to the ID of each UE.

The step is illustrated still in the above practical application scene:

after obtaining the first ID of the first UE carried by said other users, the device for pushing user information searches the current database, which stores the user information corresponding to the ID of each UE, to obtain the first user information corresponding to the first ID, namely the user information of said other users, in order to implement the following solutions.

Figure 1B:
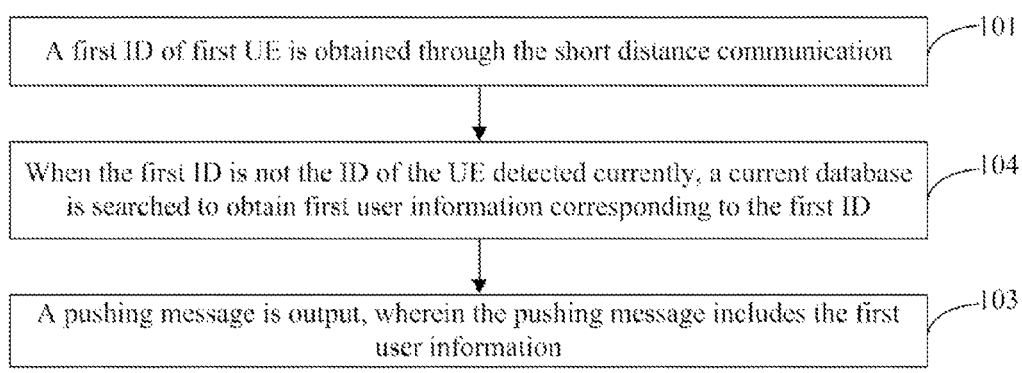
FIG. 1B is a flowchart showing a method for pushing user information, according to another exemplary aspect of the present disclosure.

In a practical application, when the user constantly stays at a certain place, if the UE of the users around stays still, then a UE list scanned by the device for pushing user information of the user will not change. Only when new UE is scanned, for example, the user starts to move, or a new user get close to the user, the device for pushing user information needs to output a pushing message (e.g., a push notification) including the user information of the new user. Correspondingly, as shown in FIG. 1B, FIG. 1B is a flowchart showing a method for pushing user information, according to another exemplary aspect; on basis of the implementation mode in FIG. 1A, Step 102 may include the following steps.

In Step 104, when the first ID is not the ID of the UE detected currently, the current database is searched to obtain the first user information corresponding to the first ID.

In this implementation mode, only when it is detected that a new UE ID appears, the database is searched to obtain the user information corresponding to the new UE ID, thereby avoiding frequent repeated processing, and effectively saving power consumption and processing resources of the device for pushing user information.

In Step 103, the pushing message is output, wherein the pushing message includes the first user information.

The step is illustrated still in the above practical application scene:

after obtaining the first user information of said other users, the device for pushing user information outputs the pushing message including the first user information in order to enable the user to get the user information of said other users accurately and timely.

Specifically, there may be various ways of outputting a pushing message, such as popping up a corresponding window on a screen to display the pushing message, or vibrating to prompt and display the pushing message, which are not limited by the present aspect herein.

Here, the user information is used for enabling users to identify the user; the contents of the user information may be determined according to the actual need, such as a user name, an equipment model, and contact information, which are not limited by the present aspect herein.

To sum up, with the method for pushing user information provided by the present aspect, when there are other users getting close to a user, the ID of UE of said other users can be obtained through the short distance communication; the user information of said other users is obtained by searching the user information corresponding to each UE ID, and the pushing message including the user information is output, thereby enabling the user to obtain the user information of said other users around accurately and timely, avoiding embarrassment and inconvenience caused by forgetfulness, and improving the accuracy and reliability of user identification.

Figure 2:
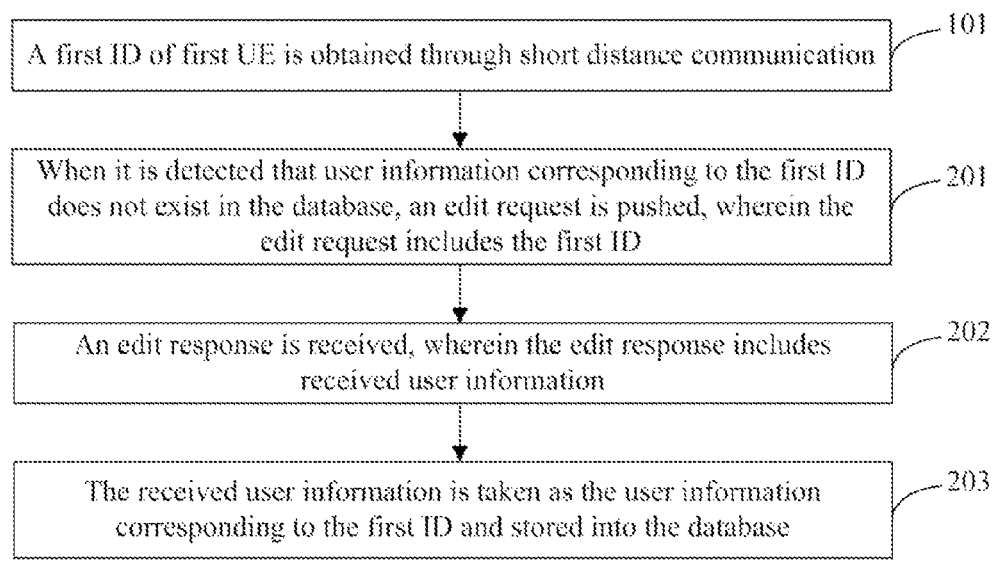
FIG. 2 is a flowchart showing a method for pushing user information, according to another exemplary aspect of the present disclosure.

FIG. 2 is a flowchart showing a method for pushing user information, according to another exemplary aspect; as shown in FIG. 2, the present aspect is illustrated by applying the method for pushing user information to a device for pushing user information; on basis of the implementation modes in FIG. 1A or FIG. 1B, the method for pushing user information may also include the following steps.

In Step 201, when it is detected that the user information corresponding to the first ID does not exist in the database, an edit request is pushed, wherein the edit request includes the first ID.

In Step 202, an edit response is received, wherein the edit response includes received user information.

In Step 203, the received user information is stored into the database and taken as the user information corresponding to the first ID.

Specifically, the executive body of the present aspect may be the device for pushing user information. The solution of the present aspect can be used for updating the database, which is illustrated through a practical application scene:

after obtaining the first ID of the first UE carried by said other users, the device for pushing user information searches the current database; when it is found that there is no user information corresponding to the first UE in the database, that is, the user information of said other users is not stored before, so it is needed to add the user information of said other users to update the database. Specifically, the device for pushing user information can push an edit request; after obtaining the user information of said other users, the user can return an edit response including the user information according to the edit request; after receiving the edit response, the device for pushing user information stores the user information in the edit response, which is taken as the user information corresponding to the first ID, into the database.

Specifically, there may be various manners of pushing an edit request; for example, an input box pops on a display interface; correspondingly, after the user inputs an owner name of the first UE and other user information in the input box, the device for pushing user information stores the first ID and the user information input by the user in the database; the various manners are not limited by the present aspect herein.

In addition, to make it convenient for the user to further identify which UE corresponds to the user information needing to be edited currently, the first ID may also include the equipment model of the first UE.

For example, suppose there are two users around the user, the model of a mobile phone used by user A is MI, the model of a mobile phone used by the other user B is iPhone, and there is no user information of the two users in the database, then the device for pushing user information needs to push two edit requests; the user may not fully identify which user's user information should be filled in if only according to the ID of UE, but the user can make a judgment according to the equipment model displayed in the edit request; for example, suppose the equipment model displayed in the edit request pushed currently is MI, then the user information of the user A can be filled in the edit response corresponding to the edit request.

To sum up, with the method for pushing user information provided by the present aspect, when it is detected that the user information corresponding to the ID obtained currently does not exist in the database, an edit request is pushed, and the user information input by the user, which is taken as the user information corresponding to the ID obtained currently, is stored into the database, thereby achieving update and completeness of the database, and improving the accuracy and reliability of user identification.

Figure 3A:
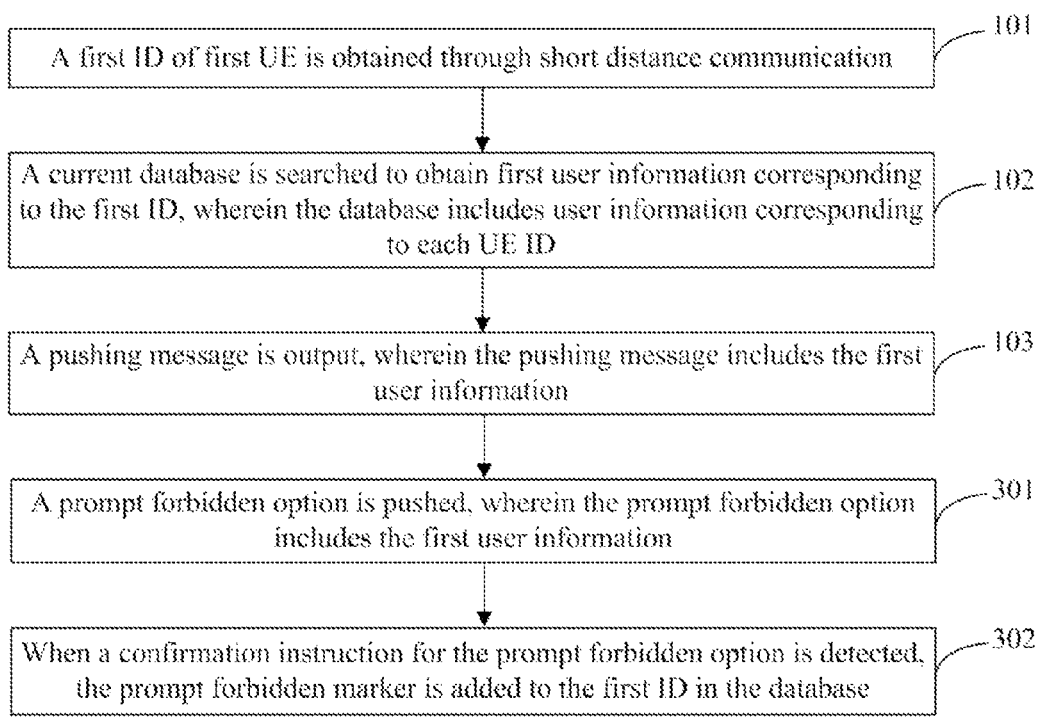
FIG. 3A is a flowchart showing a method for pushing user information, according to another exemplary aspect of the present disclosure.

FIG. 3A is a flowchart showing a method for pushing user information, according to another exemplary aspect; as shown in FIG. 3A, the present aspect is illustrated by applying the method for pushing user information to a device for pushing user information; on basis of any of above implementation modes, the method for pushing user information may also include the following steps.

In Step 301, a prompt forbidden option (e.g., a first option) is pushed, wherein the prompt forbidden option includes the first user information. According to an aspect, the prompt forbidden option is configured to allow a user to select whether or not to receive push notifications for a specific UE ID.

In Step 302, when a confirmation instruction for the prompt forbidden option is detected, a prompt forbidden marker (e.g., a first marker) is added to the first ID in the database. According to an aspect, the prompt forbidden marker is configured to prevent the output of push notifications for a specific UE ID.

The step is illustrated still in the above practical application scene:

in a practical application, there may be some other users with a close communication relationship with the user, so the user can identify the users very easily, and then there is no need to output a pushing message including the user information of said other users. Specifically, the device for pushing user information can consult with the user about whether it is also needed to identify said other users in future by pushing a prompt forbidden option while finding the first user information corresponding to the first ID and outputting the pushing message; if it is detected that the user selects the prompt forbidden option, it means that there is no need to identify said other users in future; correspondingly, the first ID in the database can be added with the prompt forbidden marker in order to facilitate identification.

Figure 3B:
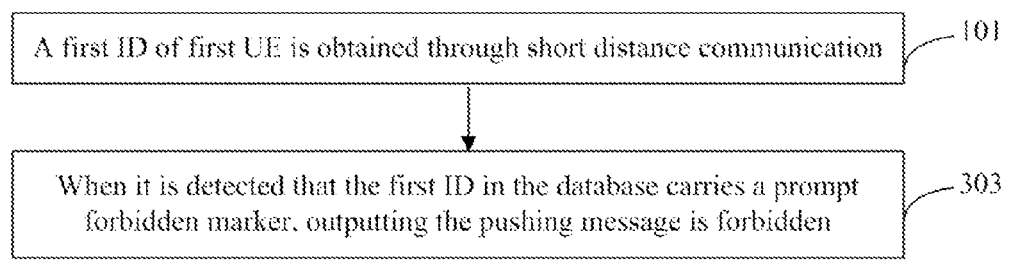
FIG. 3B is a flowchart showing a method for pushing user information, according to another exemplary aspect of the present disclosure.

Subsequently, if the obtained ID of UE is added with the prompt forbidden marker, then there is no need to output a pushing message. Correspondingly, as shown in FIG. 3B, FIG. 3B is a flowchart showing a method for pushing user information, according to another exemplary aspect; on basis of the implementation in FIG. 3A, the method for pushing user information may also include the following steps.

In Step 303, when it is detected that the first ID in the database carries the prompt forbidden marker, outputting the pushing message is forbidden.

To sum up, with the method for pushing user information provided by the present aspect, the prompt forbidden option is pushed while the pushing message including the user information is output; if the user selects the prompt forbidden option, then the prompt forbidden marker is added to the corresponding ID in the database; if the obtained ID of UE is added with the prompt forbidden marker, then there is no need to output the pushing message, thereby avoiding unnecessary processing, and further saving power consumption and processing resources of the device for pushing user information.

Figure 4A:
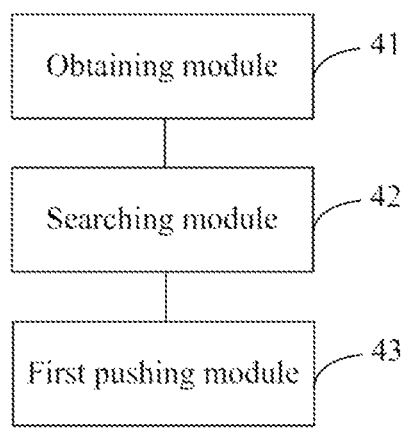
FIG. 4A is a structure diagram of a device for pushing user information, according to an exemplary aspect of the present disclosure.

FIG. 4A is a structure diagram of a device for pushing user information, according to an exemplary aspect; as shown in FIG. 4A, the device for pushing user information may include:

an obtaining module 41, which is configured to obtain a first ID of first UE through short distance communication;

a searching module 42, which is configured to search a current database to obtain first user information corresponding to the first ID obtained by the obtaining module 41, wherein the current database includes user information corresponding to each UE ID; and a first pushing module 43, which is configured to output a pushing message, wherein the pushing message includes the first user information obtained by the searching module.

Specifically, the device for pushing user information is equipped with the functions of short distance communication and pushing processing, such as a terminal and a wearable device.

The device is illustrated through a practical application scene:

a user carries the device for pushing user information; when there are other users getting close to the user, the obtaining module 41 obtains the first ID of the first UE carried by said other users through the short distance communication; the searching module 42 searches the current database, which stores the user information corresponding to each ID UE, to obtain the first user information corresponding to the first ID, namely the user information of said other users; the first pushing module 43 output the pushing message including the first user information in order to enable the user to get the user information of said other users accurately and timely.

Here, there can be various manners of performing the short distance communication by the obtaining module 41, such as NFC and Bluetooth, which are not limited by the present aspect herein.

Specifically, there can be various ways of outputting a pushing message by the first pushing module 43, such as popping up a corresponding window on a screen to display the pushing message, or vibrating to prompt and display the pushing message, which are not limited by the present aspect herein.

Here, the user information is used for enabling users to identify the user; the contents of the user information can be determined according to the actual need, such as a user name, an equipment model, and contact information, which are not limited by the present aspect herein.

Figure 4B:
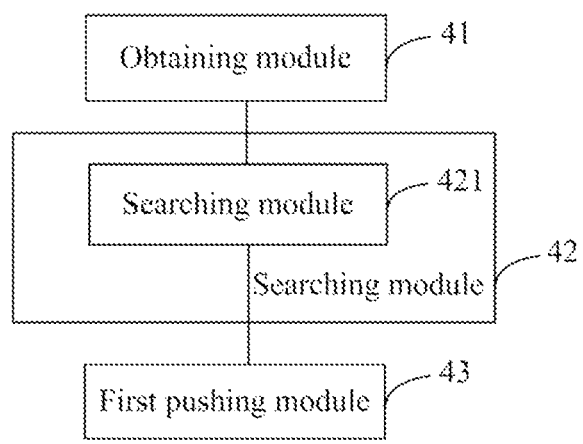
FIG. 4B is a structure diagram of a device for pushing user information, according to another exemplary aspect of the present disclosure.

In a practical application, when the user constantly stays at a certain place, if the UE of users around stays still, then a UE list scanned by the obtaining module 41 will not change. Only when new UE is scanned by the obtaining module 41, for example, the user starts to move, or a new user gets close to the user, the first pushing module 43 needs to output a pushing message including the user information of the new user. Correspondingly, as shown in FIG. 4B, FIG. 4B is a structure diagram of a device for pushing user information, according to another exemplary aspect; on basis of the implementation mode in FIG. 4A, the searching module 42 includes:

a searching submodule 421, which is configured to, when the first ID obtained by the obtaining module 41 is not the ID of the UE detected currently, search the current database to obtain the first user information corresponding to the first ID.

In the implementation mode, only when the obtaining module 41 detects that a new UE ID appears, the searching submodule 421 searches the database to obtain the user information corresponding to the new UE ID, thereby avoiding frequent repeated processing, and effectively saving power consumption and processing resources of the device for pushing user information.

To sum up, with the device for pushing user information provided by the present aspect, when there are other users getting close to the user, the ID of UE of said other users can be obtained through the short distance communication; the user information of said other users is obtained by searching the user information corresponding to each UE ID, and a pushing message including the user information is output, thereby enabling the user to obtain the user information of said other users around accurately and timely, avoiding embarrassment and inconvenience caused by forgetfulness, and improving the accuracy and reliability of user identification.

Figure 5:
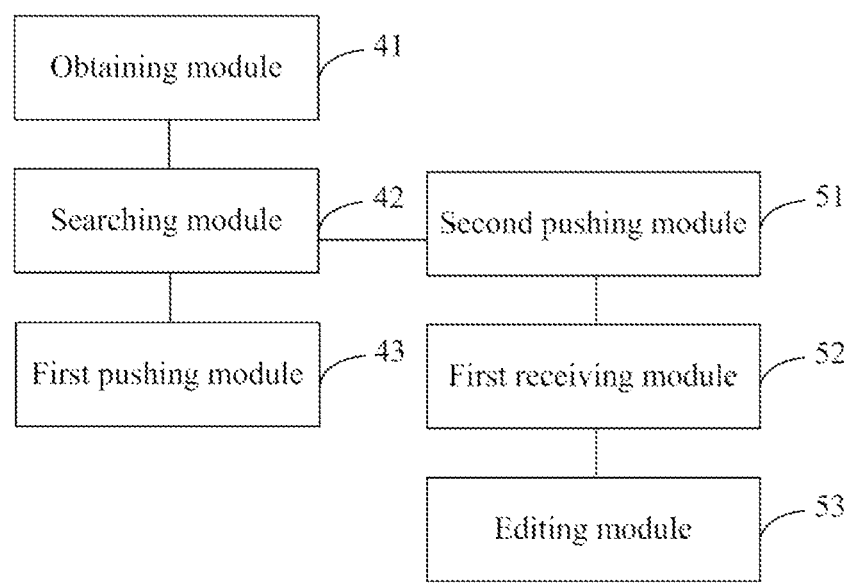
FIG. 5 is a structure diagram of a device for pushing user information, according to another exemplary aspect of the present disclosure.

FIG. 5 is a structure diagram of a device for pushing user information, according to another exemplary aspect; as shown in FIG. 5, on basis of the implementation modes in FIG. 4A or FIG. 4B, the device for pushing user information may also include:

a second pushing module 51, which is configured to, when the searching module 42 detects that the user information corresponding to the first ID does not exist in the database, push an edit request, wherein the edit request includes the first ID;

a first receiving module 52, which is configured to receive a edit response, wherein the edit response includes the received user information; and an editing module 53, which is configured to store the user information received by the first receiving module 52, which is taken as the user information corresponding to the first ID, into the database.

Specifically, the solution of the present aspect can be used for updating the database, which is illustrated through a practical application scene:

after obtaining the first ID of the first UE carried by said other users by the obtaining module 41, the searching module 42 searches the current database; when the searching module 42 finds that the user information corresponding to the first UE does not exist in the database, that is, the user information of said other users is not stored before, so it is needed to add the user information of said other users to update the database. Specifically, the second pushing module 51 can push an edit request; after obtaining the user information of said other users, the user can return an edit response including the user information according to the edit request; after the first receiving module 52 receives the edit response, the editing module 53 takes the user information in the edit response as the user information corresponding to the first ID and stores it into the database.

Specifically, there can be various manners of pushing an edit request by the second pushing module 51; for example, the input box pops on a display interface; correspondingly, after the user inputs the owner name of the first UE and other user information in the input box, the device for pushing user information stores the first ID and the user information input by the user into the database; the various manners are not limited by the present aspect herein.

In addition, to make it convenient for the user to further identify which UE corresponds to the user information needing to be edited currently, the first ID may also include the equipment model of the first UE.

To sum up, with the device for pushing user information provided by the present aspect, when it is detected that the user information corresponding to the ID obtained currently does not exist in the database, an edit request is pushed, and the user information input by the user is taken as the user information corresponding to the ID obtained currently and stored into the database, thereby achieving update and completeness of the database, and improving the accuracy and reliability of user identification.

Figure 6A:
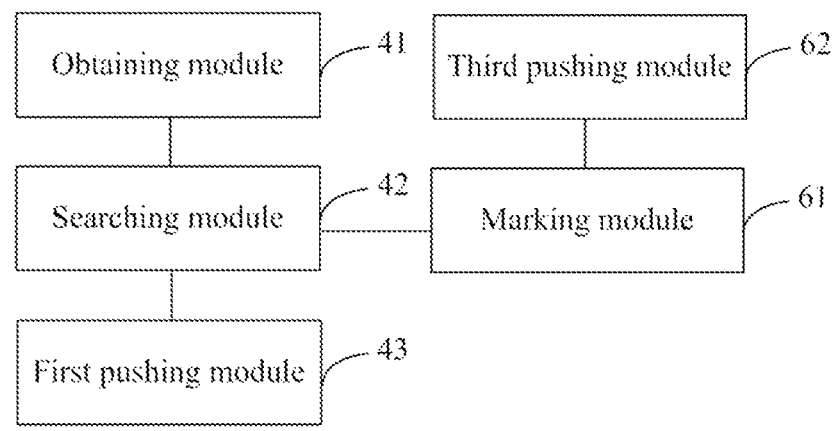
FIG. 6A is a structure diagram of a device for pushing user information, according to another exemplary aspect of the present disclosure.

FIG. 6A is a structure diagram of a device for pushing user information, according to another exemplary aspect; as shown in FIG. 6A, on basis of any above implementation, the device for pushing user information may also include:

a third pushing module 61, which is configured to push a prompt forbidden option, wherein the prompt forbidden option includes the first user information; and a marking module 62, which is configured to, when a confirmation instruction for the prompt forbidden option is detected, add the prompt forbidden marker to the first ID in the database.

The device is illustrated still through the above practical application scene:

the third pushing module 61 can consult with the user about whether it is still needed to identify other users in future by pushing the prompt forbidden option while the searching module 42 finds the first user information corresponding to the first ID and the first pushing module 43 outputs the pushing message; if it is detected that the user selects the prompt forbidden option, it means that there is no need to identify said other users in future; correspondingly, the first ID in the database can be added with the prompt forbidden marker in order to facilitate identification.

Figure 6B:
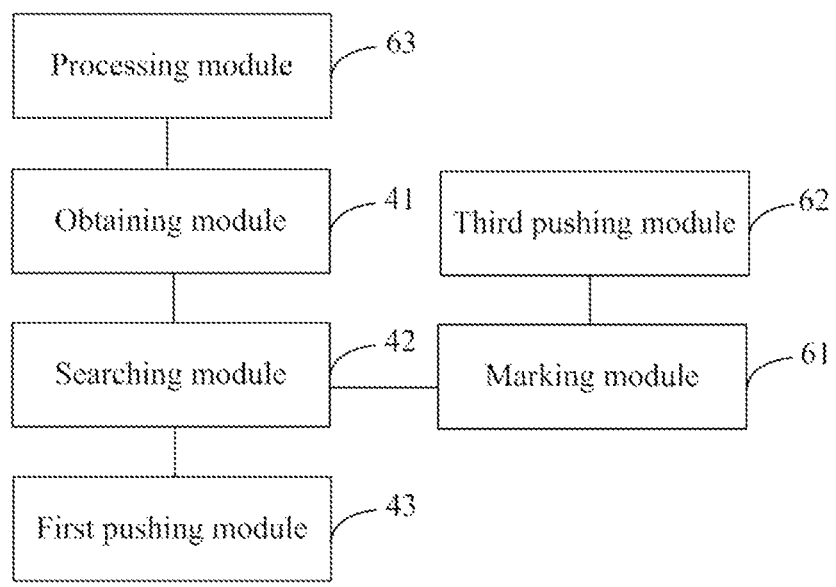
FIG. 6B is a structure diagram of a device for pushing user information, according to another exemplary aspect of the present disclosure.

Subsequently, if the ID of UE obtained by the obtaining module 41 is added with the prompt forbidden marker, then there is no need to output a pushing message. Correspondingly, as shown in FIG. 6B, FIG. 6B is a structure diagram of a device for pushing user information, according to another exemplary aspect; on basis of the implementation in FIG. 6A, the device also includes:

a processing module 63, which is configured to, when it is detected that the first ID in the database carries the prompt forbidden marker, forbid outputting the pushing message.

To sum up, with the device for pushing user information provided by the present aspect, the prompt forbidden option is pushed while the pushing message including the user information is output; if the user selects the prompt forbidden option, then the prompt forbidden marker is added to the corresponding ID in the database; if the obtained ID of UE is added with the prompt forbidden marker, then there is no need to output the pushing message, thereby avoiding unnecessary processing, and further saving power consumption and processing resources of the device for pushing user information.

The internal function and structure of the device for pushing user information are described above.

Figure 7:
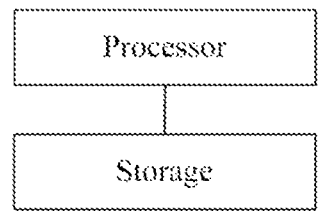
FIG. 7 is a block diagram of a device for pushing user information, according to an exemplary aspect of the present disclosure.

FIG. 7 is a block diagram of a device for pushing user information, according to an exemplary aspect; as shown in FIG. 7, the device for pushing user information can be implemented as:

a processor; and a storage, which is configured to store an instruction executable by the processor;

wherein, the processor is configured to: obtain a first ID of first UE through short distance communication; search a current database to obtain first user information corresponding to the first ID, wherein the current database includes user information corresponding to each UE ID; and output a pushing message, wherein the pushing message includes the first user information.

With the device for pushing user information provided by the present aspect, when there are other users getting close to the user, the ID of UE of said other users can be obtained through the short distance communication; the user information of said other users is obtained by searching the user information corresponding to each ID of UE, and the pushing message including the user information is output, thereby enabling the user to obtain the user information of said other users around accurately and timely, avoiding embarrassment and inconvenience caused by forgetfulness, and improving the accuracy and reliability of user identification.

Figure 8:
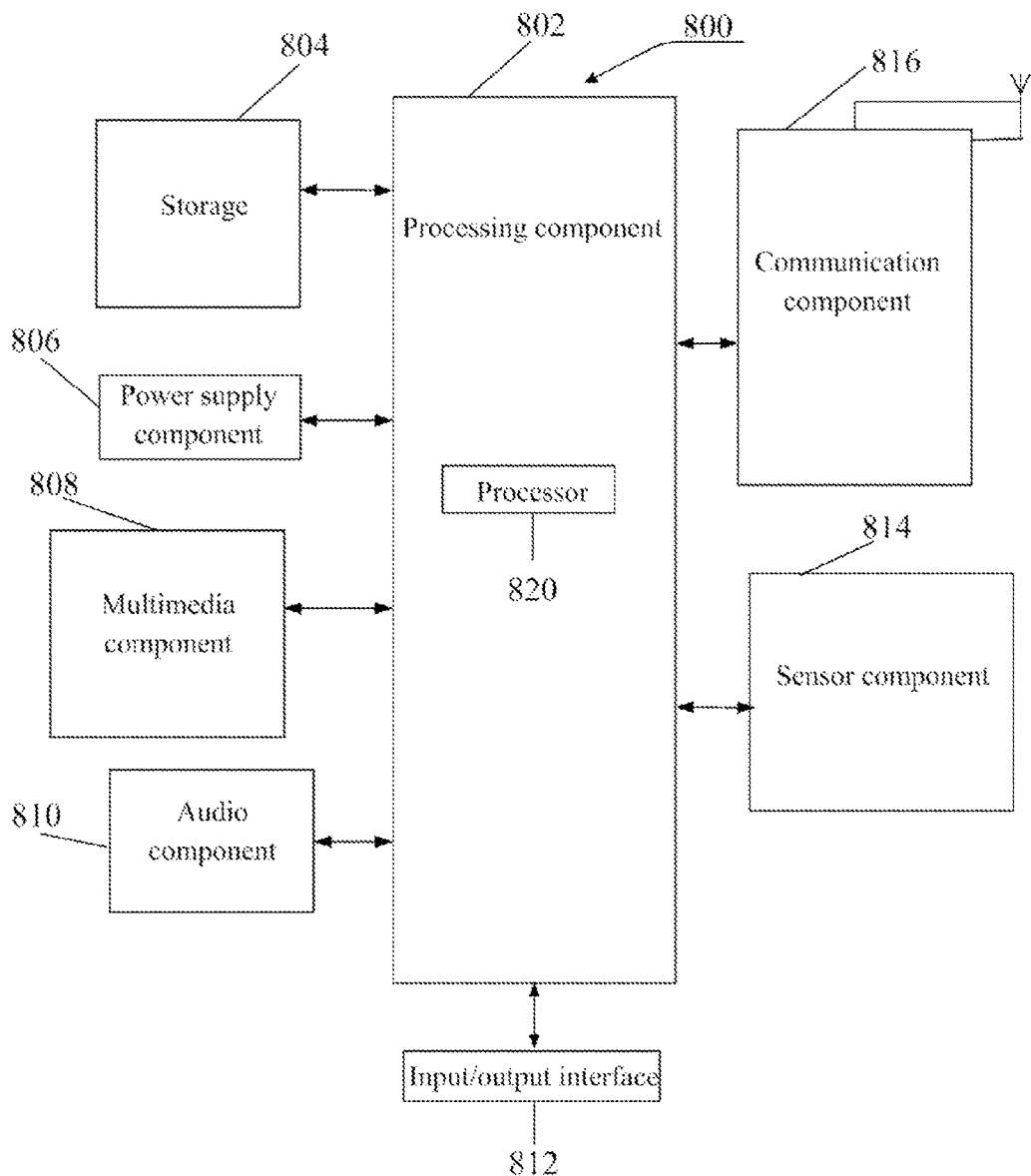
FIG. 8 is a block diagram of a device 800 for pushing user information, according to an exemplary aspect of the present disclosure.

FIG. 8 is a block diagram of a device 800 for pushing user information, according to an exemplary aspect. For example, the device 800 for pushing user information may be a computer, a terminal, a message transceiver, a game console, a tablet device, medical equipment, fitness equipment, and a personal digital assistant, and the like.

With reference to FIG. 8, the device 800 for pushing user information may include one or more than one component as follows: a processing component 802, a memory 804, a power component 806, a multimedia component 808, an audio component 810, an Input/Output (I/O) interface 812, a sensor component 814 and a communication component 816.

Generally, the processing component 802 controls the overall operations of the device 800 for pushing user information, such as the operations associated with display, phone calls, data communications, camera operations and recording operations. The processing component 802 may include one or more than one processor 820 to execute the instructions to perform all or part of steps of the above method. In addition, the processing component 802 may include one or more than one module to facilitate interaction between the processing component 802 and other components. For example, the processing component 802 may include a multimedia module to facilitate interaction between the multimedia component 808 and the processing component 802.

The memory 804 is configured to store various types of data to support operations of the device 800. Examples of such data include instructions for any applications or methods operated on the device 800, contact data, telephone directory data, messages, pictures, video, etc. The memory 804 may be implemented using any type of volatile or non-volatile storage devices or a combination of them, such as a Static Random Access Memory (SRAM), an Electrically Erasable Programmable Read-Only Memory (EE- PROM), an Erasable Programmable Read-Only Memory (EPROM), a Programmable Read Only Memory (PROM), a Read Only Memory (ROM), a Magnetic Memory, a Flash Memory, a Magnetic Disk or an Optical Disk.

The power component 806 provides power for each component of the device 800 for pushing user information. The power component 806 may include a power management system, one or more than one power source, and other components associated with the generation, management, and distribution of power in the device 800.

The multimedia component 808 includes a screen which provides an output interface between the device 800 for pushing user information and the user. In some aspects, the screen may include a Liquid Crystal Display (LCD) and a Touch Panel (TP). If the screen includes the TP, then the screen can be implemented as a touch screen to receive an input signal from the user. The TP includes one or more than one touch sensor to sense touches, swipes, and gestures on the touch panel. The touch sensors may not only sense a boundary of a touch or swipe action, but also sense a period of time and a pressure associated with the touch or swipe action. In some aspects, the multimedia component 808 includes a front camera and/or a rear camera. The front camera and the rear camera may receive an external multimedia datum while the device 800 is in an operation mode, such as a photographing mode or a video mode. Each of the front camera and the rear camera may be a fixed optical lens system or have focus and optical zoom capability.

The audio component 810 is configured to output and/or input an audio signal. For example, the audio component 810 includes a Microphone (MIC); when the device 800 for pushing user information is in the operation mode, e.g. a calling mode, a recording mode and a voice recognition mode, the MIC is configured to receive an external audio signal. The received audio signal may be further stored in the memory 804 or sent via the communication component 816. In some aspects, the audio component 810 also includes a loudspeaker for outputting the audio signal.

The I/O interface 812 provides an interface between the processing component 802 and a peripheral interface module; the peripheral interface module can be a keyboard, a click wheel, buttons, etc. These buttons may include, but is not limited to, a home button, a volume button, a start button and a lock button.

The sensor component 814 includes one or more than one sensor for providing status assessments of various aspects of the device 800 for pushing user information. For example, the sensor component 814 can detect an open/close state of the device 800 for pushing user information and relative positioning of components, for example, the components are a display and a keypad of the device 800 for pushing user information; the sensor component 814 can also detect a position change of the device 800 for pushing user information or a component of the device 800 for pushing user information, the presence or absence of touch between the user and the device 800 for pushing user information, an orientation or an acceleration/deceleration or the device 800 for pushing user information, and a temperature change of the device 800 for pushing user information. The sensor component 814 may include a proximity sensor, which is configured to detect the presence of a nearby object when there is no any physical contact. The sensor component 814 may also include an optical sensor, such as a Complementary Metal-Oxide Semiconductor (CMOS) or a Charge Coupled Device (CCD) image sensor, which is used for imaging application. In some aspects, the sensor component 814 may also include an acceleration sensor, a gyroscope sensor, a magnetic sensor, a pressure sensor or a temperature sensor.

The communication component 816 is configured to facilitate wired or wireless communication between the device 800 for pushing user information and other devices. The device 800 for pushing user information can access a wireless network based on a communication standard, such as WiFi, 2G or 3G, or a combination of them. In an exemplary aspect, the communication component 816 receives, via a broadcast channel, a broadcast signal or broadcast related information from an external broadcast management system. In an exemplary aspect, the communication component 816 also includes an NFC module for facilitating short range communication. For example, the NFC module may be implemented based on a Radio Frequency Identification (RFID) technology, an Infrared Data Association (IrDA) technology, a Ultra Wideband (UWB) technology, a Bluetooth (BT) technology and other technologies.

In an exemplary aspect, the device 800 for pushing user information may be implemented with one or more application specific integrated circuits (ASICs), a Digital Signal Processors (DSPs), Digital Signal Processing Devices (DSPDs), Programmable Logic Devices (PLDs), Field Programmable Gate Arrays (FPGAs), controllers, microcontrollers, microprocessors or other electronic components, for performing the above methods.

In an exemplary aspect, a non-temporary computer-readable storage medium including instructions is also provided, such as included in the memory 804, executable by the processor 820 of the device 800 for pushing user information to perform the above method. For example, the non-temporary computer-readable storage medium may be a ROM, a Random Access Memory (RAM), a CD-ROM, a magnetic tape, a floppy disk, an optical data storage device, etc.

For the non-temporary computer-readable storage medium, when the instructions in the storage medium are executed by the processor of the device for pushing user information, the device for pushing user information can execute a method for pushing user information; the method includes that:

a first ID of first UE is obtained through short distance communication; a current database is searched to obtain first user information corresponding to the first ID, wherein the database includes the user information corresponding to each UE ID; and a pushing message is output, wherein the pushing message includes the first user information.

Those skilled in the art can clearly understand that for describing conveniently and succinctly, the specific working process of the above device may refer to the corresponding process in the aspects of the method.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the present disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for pushing user information, comprising:
obtaining, by a device for pushing user information, a first identity (ID) of a first user equipment (UE) through short distance communication;
when the first ID is not an ID of a detected UE, searching a first database to obtain first user information corresponding to the first ID, the first database including user information corresponding to respective ones of a plurality of UE IDs; and
outputting, by the device for pushing user information, a push notification including the first user information;
when it is detected that the user information corresponding to the first ID does not exist in the first database, generating, by the device for pushing user information, an edit request including the first ID;
receiving, by the device for pushing user information, an edit response including a received user information; and
storing, by the device for pushing user information, the received user information, which is designated as the user information corresponding to the first ID.

2. The method of claim 1, further comprising:
generating a first option that is configured to allow a user to toggle push notifications for respective ones of the plurality of UE IDs, wherein the first option includes the first user information.

3. The method of claim 2, further comprising:
receiving a selection to activate the first option for the first ID; and
adding a first marker to the first ID in the first database.

4. The method of claim 3, wherein the first marker is configured to prevent an output of the push notification including the first user information.

5. A device for pushing user information, comprising:
a processor; and
a storage configured to store an instruction executable by the processor,
wherein the processor is configured to:
obtain a first identity (ID) of a first user equipment (UE) through short distance communication;
when the first ID is not an ID of a detected UE, search a first database to obtain first user information corresponding to the first ID, the first database including user information corresponding to respective ones of a plurality of UE IDs;
output a push notification including the first user information;
when it is detected that the user information corresponding to the first ID does not exist in the first database, generate an edit request including the first ID;
receive an edit response including a received user information; and
store the received user information, which is designated as the user information corresponding to the first ID.

6. The device of claim 5, wherein the processor is further configured to:
generate a first option that is configured to allow a user to toggle push notifications for respective ones of the plurality of UE IDs, wherein the first option includes the first user information.

7. The device of claim 6, wherein the processor is further configured to:
receive a selection to activate the first option for the first ID; and
add a first marker to the first ID in the first database.

8. The device of claim 7, wherein the first marker is configured to prevent an output of the push notification including the first user information.

9. A non-transitory computer-readable storage medium having stored therein instructions that, when executed by a processor, cause the processor to:
obtain a first identity (ID) of a first user equipment (UE) through short distance communication;
when the first ID is not an ID of a detected UE, search a first database to obtain first user information corresponding to the first ID, the first database including user information corresponding to respective ones of a plurality of UE IDs;
output a push notification including the first user information;
when it is detected that the user information corresponding to the first ID does not exist in the first database, generate an edit request including the first ID;
receive an edit response including a received user information; and
store the received user information, which is designated as the user information corresponding to the first ID.

10. The non-transitory computer-readable storage medium according to claim 9, further having stored therein instructions that, when executed by the processor, cause the processor to:
generate a first option that is configured to allow a user to toggle push notifications for respective ones of the plurality of UE IDs, wherein the first option includes the first user information.

11. The non-transitory computer-readable storage medium according to claim 10, further having stored therein instructions that, when executed by the processor, cause the processor to:
receive a selection to activate the first option for the first ID; and
add a first marker to the first ID in the first database.

12. The non-transitory computer-readable storage medium according to claim 11, wherein the first marker is configured to prevent an output of the push notification including the first user information.

* * * * *